United States Patent Office 3,755,445
Patented Aug. 28, 1973

3,755,445
CYCLOALKYL-ALKYLENE- AND ARYLALKYLENE-POLYAMINES
Ernst Hanschke, Burghausen, Walter Fester, Konigstein, Taunus, and Franz Jakob, Hofheim, Taunus, Germany, assignors to Farbwerke Hoechst Aktiengesellschaft vormals Meister Lucius & Bruning, Frankfurt am Main, Germany
No Drawing. Filed Aug. 19, 1970, Ser. No. 65,298
Claims priority, application Germany, Aug. 26, 1969,
P 19 43 254.3
Int. Cl. C07c 87/02, 87/28
U.S. Cl. 260—563 R       2 Claims

ABSTRACT OF THE DISCLOSURE

Novel polyamines are prepared in known manner. They have the formula

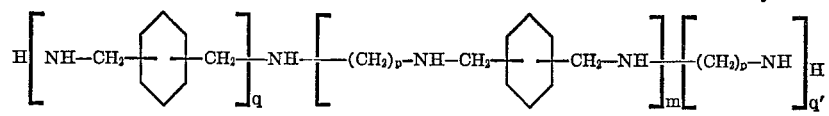

in which:

$p$ represents a whole number of from 1 to 12, preferably from 2 to 4,
$q$ and $q'$ equal 0 or 1,
$m$ represents a whole number of from 1 to 10, preferably from 1 or 2 (if $q$ and $q'$ are 0) to 4, the linkages of the rings are 1,3 and/or 1,4-linkages, and, optionally, to a small extent, also 1,2-linkages, at least half of the rings being cyclo-aliphatic, the rest being aromatic. The rings may also be substituted by low molecular weight alkyl groups. The polyamines are suitable, for example, as modification components for the preparation of film and fiber-forming polyamides.

---

The present invention relates to novel polyamines and to a process for preparing them.

Canadian Pat. No. 837,201 describes a process for the preparation of polyamines by means of desaminating hydrogenation of xylylene diamine(s), in which process polyamines are formed, in the molecule chains of which the six-membered rings originating from xylylene diamine are all hydrogenated, i.e. cyclo-aliphatic. These polyamines are distinguished by a remarkable thermostability which makes them suitable for numerous application purposes, for example for the modification of film and fiber-forming polyamides and as hardeners for epoxide resins. The said polyamines have the formula

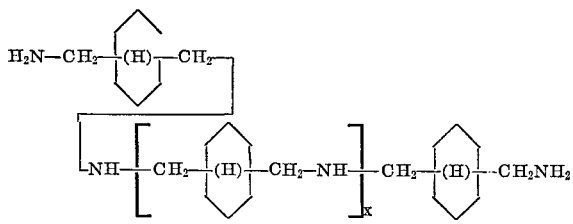

in which $x$ equals 0 or a whole number of from 1 to 30, preferably from 0 to 10, and in which the linkages of the rings are preferably 1,3- and 1,4-linkages.

The present invention provides novel polyamines of the formula

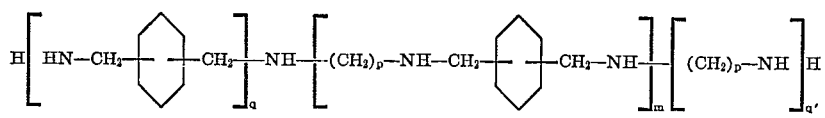 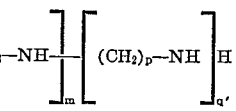

in which:

$p$ represents a whole number of from 1 to 12, preferably from 2 to 4,
$q$ and $q'$ equal 0 or 1,
$m$ represents a whole number of from 1 to 10, preferably from 1 or 2 (if $q$ and $q'$ are 0) to 4, the linkages of the rings preferably being 1,3- and 1,4-linkages, and in which at least half of the rings are cyclo-aliphatic—the rest being aromatic.

Preference is given to those polyamines of the above-mentioned structure which have exclusively cyclo-aliphatic rings or cyclo-aliphatic and aromatic rings in an alternating sequence.

These polyamines exhibit a very good thermostability. They do not decompose, nor do they show any discoloration, even if heated for some time at 200° C. and more, whereas the corresponding polyamines containing exclusively aromatic rings in the molecular chains, instead of cyclo-aliphatic and aromatic ones, show a brown discoloration and signs of decomposition already after a very short time, if heated at 200° C. The stabilizing effect of cyclo-aliphatic rings in the corresponding polyamine molecular chains is surprising and has not been described so far. The polyamines in accordance with the invention are advantageously prepared while using as starting compound hydrogenated xylylene diamine or a mixture of at least 50 mol percent of hydrogenated xylylene diamine and non-hydrogenated xylylene diamine and dichloralkanes of the formula Cl(CH$_2$)$_p$Cl ($p$ representing a whole number of from 1 to 12, preferably from 2 to 4), optionally in the presence of NH$_3$ (if the molar ratio of hydrogenated/non-hydrogenated xylylene diamine to dichloralkane is 1:1), the preparation being effected in accordance with processes that are common for reactions of this kind. Hydrogenated 1,3- or 1,4-xylylene diamine, as well as mixtures of these hydrogenated xylylene diamines, are used as hydrogenated xylylene diamine starting compounds. Hydrogenated o-xylylene diamine is less suitable; it can be used, however, in a small amount—to a maximum of about 10%—in a mixture with hydrogenated 1,3- and/or 1,4-xylylene diamine. What has been said about the isomers of the hydrogenated xylylene diamine starting compound, is also true for the non-hydrogenated xylylene diamine, if it is used, too, as starting compound. If, in the preparation of the polyamines in accordance with the invention, no uniform hydrogenated (and non-hydrogenated) xylylene diamine isomer is used as starting compound, the linkages of the ring of the final product are, naturally, not uniform either, but consist of 1,3-, 1,4- and, optionally, 1,2-linkages. It is also possible to use, instead of a uniform dichloralkane, a mixture of two or several dichloralkanes falling under the above general formula Cl(CH$_2$)$_p$Cl (with different values for $p$). Furthermore, it is possible to use, instead of the unsubstituted hydrogenated and non-hydrogenated xylylene diamines, hydrogenated and non-hydrogenated xylylene diamines that have been substituted preferably by low molecular weight alkyl groups having from 1 to 5 carbon atoms. In this case, the polyamines obtained have (alkyl-) substituted cyclohexane and benzene rings in the molec-

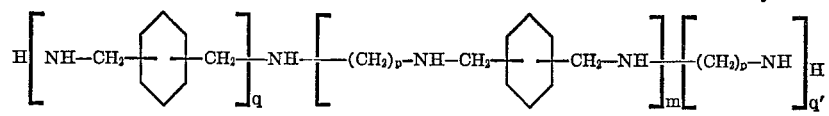 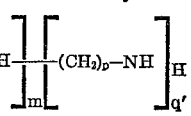

ular chains, instead of the unsubstituted rings in the formula for the polyamines according to the invention.

The polyamines of the invention can also be prepared in a different manner, for example by means of desaminating hydrogenation of xylylene diamine(s) and the corresponding diaminoalkanes of the formula

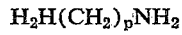

($p$ representing a whole number of from 1 to 12, preferably from 2 to 4) at an elevated temperature and an increased hydrogen pressure, while using preferably a nickel catalyst containing other heavy metals. If in this process polyamines are to be obtained which contain, besides cyclo-aliphatic rings, also aromatic rings in the molecule chains, the reaction has to be stopped before the amount of $H_2$ necessary for the complete hydrogenation of the aromatic nuclei of xylene has been absorbed. If the reaction is stopped after half the amount of $H_2$ necessary for the complete hydrogenation has been absorbed, polyamines are obtained which have cyclo-aliphatic and aromatic rings in the molecular chains in the same ratio.

The polyamines of the invention are colourless, or at the most slightly yellow, completely liquid substances, which are suitable, for example, as modification components for the preparation of film and fiber-forming modified polyamides in accordance with U.S. patent application Ser. No. 65,300 filed concurrently herewith and entitled "Fiber-Forming Polyamides With an Increased Content of Amino Groups" and now U.S. Pat. No. 3,711,447 issued on Jan. 16, 1973.

The following examples serve to illustrate the invention.

EXAMPLES (1) A mixture was prepared consisting of 3 moles of a mixture of hexahydroxylylene diamine isomers (1,3-:1,4 - hexahydroxylylene diamine 7:3) and the amount of aqueous sodium hydroxide solution of 40–50% strength calculated on 1 mole of ethylene chloride, the mixture was heated with reflux to about 100° C., while 1 mole of ethylene chloride was dropped in, and was then kept for another hour at about 100° C. Subsequently the water was removed by means of azeotropic distillation with xylene, the residue was freed from NaCl by suction, and xylene as well as the excess of the starting diamine were distilled off in vacuo. The residue, which was practically colorless, had a nitrogen content of 16.9% (theoretical value for the product consisting of 2 moles of hexahydroxylylene diamine and 1 mole of ethylene chloride: 18%), the yield was 98%. The product did not show any discoloration when heated to 260° C.

(2) If, instead of the 3 moles of hexahydroxylylene diamine of Example 1, a mixture consisting of 1.5 moles of hexahydroxylylene diamine and 1.5 moles of xylylene diamine was used as starting compound for the reaction with ethylene chloride, a thermostable polyamine was also obtained.

COMPARATIVE EXAMPLE

A polyamine prepared in analogous manner on the basis of 3 moles of a mixture of non-hydrogenated xylylene diamine isomers (ratio of m- to p-xylylene diamine 7:3) and 1 mole of ethylene chloride (yield: 81.5%, amine number 127, nitrogen content: 17.7%) resinified in the thermal test at temperatures over 200° C., while splitting off ammonia and showing a brown discoloration.

What is claimed is:

1. A polyamine of the formula

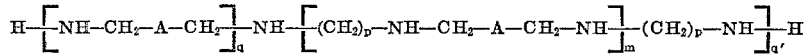

wherein A represents cyclohexylene or phenylene, at least half of the A's are cyclohexylene groups; $p$ represents a whole number from 1 to 4; $q$ and $q'$ equals 0 or 1; $m$ represents a whole number from 2 to 4 when $q$ and $q'$ are 0 and 1 to 4 when $q$ and $q'$ are greater than 0.

2. A polyamine as defined in claim 1 having only cyclohexylene groups in the molecular chain.

References Cited

UNITED STATES PATENTS

| | | | |
|---|---|---|---|
| 2,519,440 | 8/1950 | Benneville et al. | 260—570.9 X |
| 3,196,180 | 7/1965 | Albert | 260—570.5 |
| 3,351,650 | 11/1967 | Cross et al. | 260—563 X |

OTHER REFERENCES

Teshiro et al.: "Chemical Abstracts," vol. 67, 72946k, p. 6853 (1967).

ROBERT V. HINES, Primary Examiner

U.S. Cl. X.R.

260—78 R, 78 TF, 570.5 P, 570.9